US007395200B2

(12) United States Patent
Roston

(10) Patent No.: US 7,395,200 B2
(45) Date of Patent: Jul. 1, 2008

(54) REMOTE LANGUAGE INTERPRETATION SYSTEM AND METHOD

(75) Inventor: John Roston, Montreal (CA)

(73) Assignee: McGill University, Montreal, Quebec (CA)

( * ) Notice: Subject to any disclaimer, the term of this patent is extended or adjusted under 35 U.S.C. 154(b) by 800 days.

(21) Appl. No.: 10/825,681

(22) Filed: Apr. 16, 2004

(65) Prior Publication Data

US 2004/0210603 A1    Oct. 21, 2004

Related U.S. Application Data

(60) Provisional application No. 60/463,332, filed on Apr. 17, 2003.

(51) Int. Cl.
*G06F 17/28* (2006.01)
*G09G 5/00* (2006.01)
*H04N 7/14* (2006.01)

(52) U.S. Cl. ............................ 704/3; 345/1.1; 348/14.08

(58) Field of Classification Search ....................... None
See application file for complete search history.

(56) References Cited

OTHER PUBLICATIONS

Kato et al ("Visual Communication with Dual Video Transmissions for Remote Sign Language Interpretation Services", IEEE SMC, 2002).*

Anton Klechenov, Aditya Kumar Gupta, Weng Fai Wong, Teck Khim Ng, Wee Kheng Leow; "Real-time Mosaic for Multi-Camera Videoconferencing"; downloaded from http://dspace.mit.edu/retrieve/3387/cs024.pdf as early as Apr. 2003; 5 pages.

"Video Remote Interpreting"; http://www.signtalkamerica.com/pages/2/page2.html?refresh=1043337133668; pp. 1-2, Mar. 28, 2003.

"Products" http://checkout.verisign.com/cgi-bin/ePages.storefront/3e84ceee0026d028271ec0a801bc06a8/Exp... Mar. 28, 2003 pp. 1-3.

Tele-HealthCare Solutions; downloaded from www.tandbergapplications.com as early as Apr. 2003; 4 pages.

* cited by examiner

*Primary Examiner*—Tālivaldis Ivars Šmits
*Assistant Examiner*—Samuel G Neway

(57) ABSTRACT

A method and system of providing language interpretation between a first person and a second person in visual contact with one another. The method comprises receiving from the remote language interpreter an audio signal emitted by the interpreter and video images of the interpreter; outputting the audio signal emitted by the interpreter; displaying the video images of the interpreter on a first display viewable by the first person while maintaining visual contact with the second person; and displaying the video images of the interpreter on a second display viewable by the second person while maintaining visual contact with the first person. In the case of sign language, the use of separate displays allows a hearing person and a non-hearing person to face one another while also viewing the interpreter.

24 Claims, 2 Drawing Sheets

REMOTE LANGUAGE INTERPRETATION SYSTEM AND METHOD

CROSS-REFERENCE TO RELATED APPLICATION

The present application claims the benefit under 35 U.S.C. §119(e) of provisional U.S. patent application Ser. No. 60/463,332, filed Apr. 17, 2003, hereby incorporated by reference herein.

FIELD OF THE INVENTION

The present invention relates generally to videoconferencing systems and, in particular, to a videoconferencing system having particular application to remote language interpretation and especially remote sign language interpretation.

BACKGROUND OF THE INVENTION

Videoconferencing technology has been used to improve the responsiveness of sign language interpretation services while lowering their costs. A common example of this is in the healthcare sector. Specifically, the typical videoconferencing setup in a doctor-patient environment assumes that the patient (who is usually taken to be a non-hearing individual) is lying or sitting down, while the doctor (who is taken to be a hearing individual) stands or sits to one side of the patient. A single video camera/monitor combination is positioned such that the patient and a remote interpreter can visually communicate with one another. In addition, a microphone and a speaker are provided, allowing the doctor and the remote interpreter to hear one another. In this way, sign language interpretation can be provided virtually on demand while the interpreter is in a remote location, such as a call center.

However, the foregoing system suffers from drawbacks that tend to lead to marginal acceptance of the system by non-hearing patients. Specifically, due to the natural tendency of most people to look at a monitor when communicating with an individual viewed therein, the doctor will usually turn away from the patient at the very moment that communication with the patient is supposed to be taking place. The resulting loss of eye contact with the patient may slow down the communication process due the absence of facial cues such as when the patient is expressing pain or when the doctor is asking a question. Over the long term, the doctor's repeated movements away from the patient when communicating with him or her can be detrimental to the rapport between the doctor and the patient.

Of note is the fact that the aforementioned disadvantages may also arise with traditional sign language interpretation. Specifically, since the patient and the doctor are in close proximity to one another, a live interpreter may find it difficult to assume a position in a hospital room that allows eye contact to be maintained with both the patient and the doctor, while also allowing the patient and the doctor to face one another.

Thus, service providers, insurance companies, governments and members of the non-hearing community, among others, will realize that there is a need to provide an improved remote sign language interpretation system which would allow enhanced communication and enable more effective delivery of medical care and other services. Moreover, similar needs exist when remote language interpretation, other than sign language, is required.

SUMMARY OF THE INVENTION

According a first broad aspect, the invention provides a method of providing language interpretation between a first person and a second person in visual contact with one another, comprising: receiving from the remote language interpreter an audio signal emitted by the interpreter and video images of the interpreter; outputting the audio signal emitted by the interpreter; displaying the video images of the interpreter on a first display viewable by the first person while maintaining visual contact with the second person; and displaying the video images of the interpreter on a second display viewable by the second person while maintaining visual contact with the first person.

In a specific non-limiting embodiment, the language is sign language.

According to a second broad aspect, the present invention may be summarized as a method of facilitating language communication between a first person and a second person proximate one another, comprising: providing a first visual communication link between the first person and a remote language interpreter; providing a second visual communication link between the second person and the remote language interpreter; providing an audio communication link between the second person and the remote language interpreter; the first and second visual communication links and the audio communication link being provided while the first and second persons are in visual contact with each other.

The invention may be summarized according to a third broad aspect as a system for providing language interpretation between a first person and a second person located proximate one another, comprising: first video capture means for capturing video images of the first person; second video capture means for capturing video images of the second person; means for capturing an audio signal emitted by at least the second person; means for outputting an audio signal conveying information resulting from language interpretation of the video images of the first person; means for displaying video images conveying language information resulting from interpretation of the audio signal emitted by at least the second person and the video images of the second person.

According to yet another broad-aspect, the present invention may be summarized as a signal tangibly embodied in a transmission medium, comprising: in a first direction: a first video stream conveying video images of a first person; a second video stream conveying video images of a second person; and a first audio stream conveying an audio signal emitted by at least the second person. In a second direction, opposite the first direction, the signal comprises a third video stream conveying language information resulting from interpretation of the audio signal emitted by at least the second person and the video images of the second person; and a second audio stream conveying information resulting from sign language interpretation of the video images of the first person.

According to still another broad aspect, the present invention may be summarized as a system for providing language interpretation between a first person and a second person in visual contact with one another, comprising: means for receiving from the remote language interpreter an audio signal emitted by the interpreter and video images of the interpreter; means for outputting the audio signal emitted by the interpreter; means for displaying the video images of the interpreter on a first display viewable by the first person while the first person maintains visual contact with the second person; and means for displaying the video images of the interpreter on a second display viewable by the second person while the second person maintains visual contact with the first person.

These and other aspects and features of the present invention will now become apparent to those of ordinary skill in the art upon review of the following description of specific embodiments of the invention in conjunction with the accompanying drawings.

DETAILED DESCRIPTION OF THE EMBODIMENTS

Figure 1:
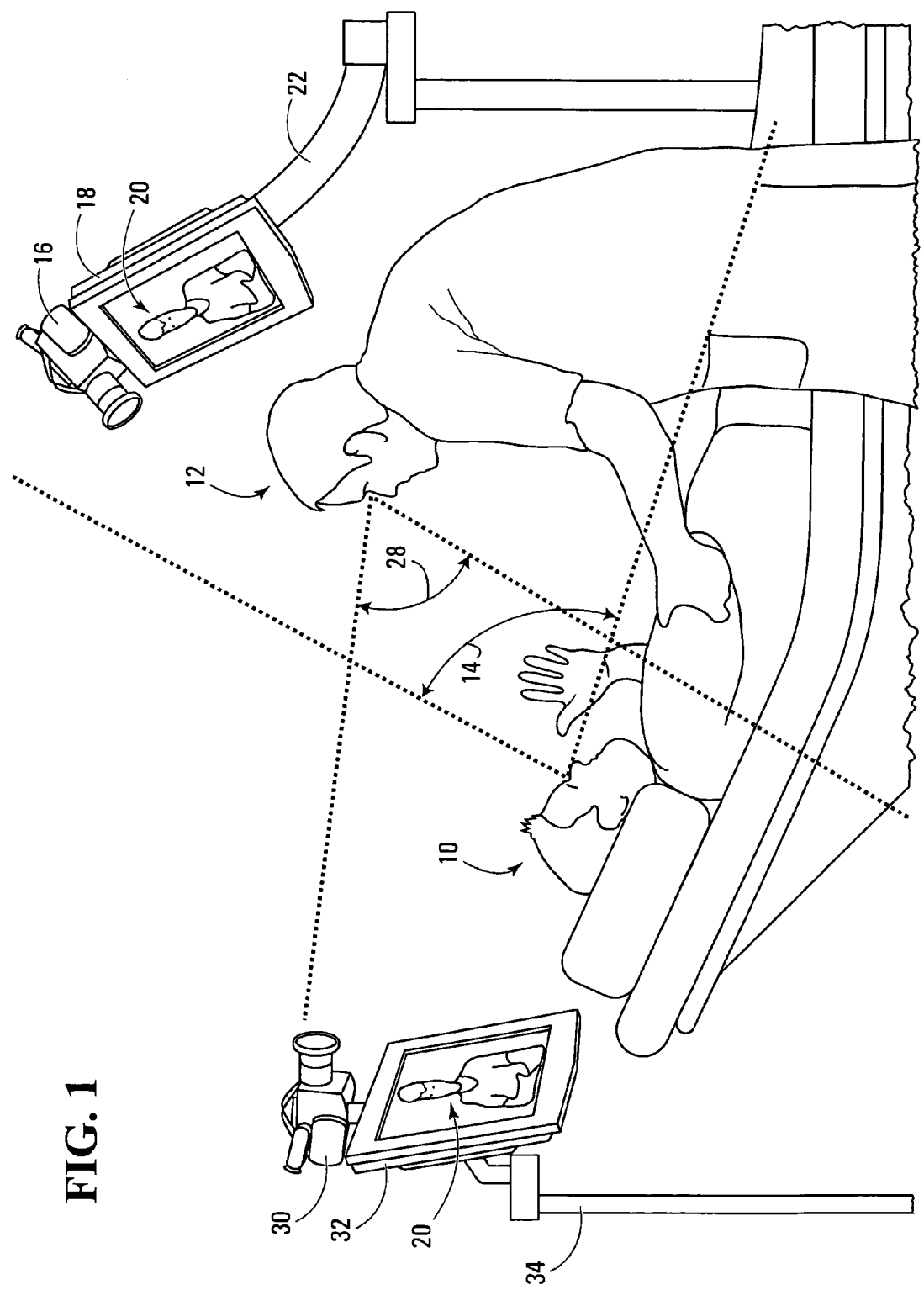
FIG. 1 is illustrative of a setup that facilitates sign language interpretation between a non-hearing person and a hearing person using a remote sign language interpreter.

FIG. 1 shows a setup that facilitates sign language interpretation between a first person 10 and a second person 12. In this scenario of sign language interpretation, the first person 10 is taken to be a "non-hearing" person, which assumes, at a minimum, that this person is capable of articulating with his or her hands, fingers, arms, lips and face. In contrast, the second person 12 is taken to be a "hearing person", which assumes that this person is, at a minimum, capable of hearing and talking. Additionally, both the non-hearing person 10 and the hearing person 12 are assumed to be capable of seeing. It should be understood that the designations of "hearing" and "non-hearing" as applied to the individuals 10 and 12 assume only the minimum conditions and thus do not prevent the invention from being applied with advantage to facilitating sign language interpretation between two individuals who are both actually capable of hearing, talking, seeing and articulating. In the latter case, the present invention may find advantage when persons 10 and 12 are both capable of hearing, but speak different languages and require remote language translation services.

Possible applications of the setup shown in FIG. 1 include but are not limited to health care, justice, law enforcement, human resources and education. In a specific example, the hearing person is a health care professional and the non-hearing person 10 is his or her patient. Of course, other applications are envisaged and the role of the hearing and non-hearing persons could also be reversed. What each of these situations shares is the desirability of having the non-hearing person 10 be in proximity to the hearing person 12 and the desirability of maintaining visual contact between the two individuals 10, 12. Similarly it is desirable that two individuals capable of hearing, but speaking different languages, can maintain eye contact with each other and also see and be seen by the language translator.

A field of view of the non-hearing person 10 is indicated at 14. It is noted that the field of view 14 of the non-hearing person 10 includes the expected position of the head and other body parts of the hearing person 12. Within this field of view 14 are positioned a video camera 16 (e.g., analog camcorder, digital camcorder, CCD, etc.) and a display 18 (e.g., CRT monitor, flat screen, LCD, plasma, etc.). The video camera 16 takes images which are sent to a remote sign language interpreter 20 in a manner to be described herein below in greater detail. The display 18, also within the field of view 14 of the non-hearing person, shows images of the interpreter 20 which typically convey sign language. Thus, the non-hearing person 10 communicates with the interpreter 20 through the use of the display 18 and the video camera 16. Mechanically, the video camera 16, typically being of smaller dimensions that the display 18, may be mounted thereto and the two components may be movable together by way of a mechanical arm 22. The mechanical arm 22 might be affixed to a structure such as a stand, wall, ceiling or the bed where one of the individuals (in this case, the non-hearing person 10) might be located. Of course, it is within the scope of the present invention to provide an assembly for the video camera 16 and display 18 having a degree of mobility and portability suited to the particular application at hand.

Continuing now with the description of the setup in FIG. 1, the hearing person 12 communicates with the interpreter 20 primarily, although not exclusively, through audio information. Specifically, a microphone 24 (referred to in FIG. 2 but not shown in FIG. 1) is positioned in such a way as to capture an audio signal emitted by the hearing person 12. The microphone 24 can be integrated with the video camera 16. However, this arrangement may be prone to picking up extraneous sounds in the room where the individuals 10, 12 are located. Thus, it may be desirable for the microphone 24 to be worn by the hearing person 12. In addition, an amplifier 26 (e.g., a loudspeaker or earphones, also referred to in FIG. 2 but not shown in FIG. 1) are provided to convey an audio signal emitted by the interpreter.

In addition to communicating with the interpreter 20 through the use of the amplifier 26 and the microphone 24, the hearing person 12 also provides visual cues to the interpreter 20 and benefits from viewing the visual information conveyed by the interpreter 20 during signing. Thus, visual contact is maintained between the hearing person 12 and the interpreter 20. The setup of FIG. 1 allows this to be achieved while the hearing person 12 maintains visual contact with the non-hearing person 10.

Specifically, a field of view of the hearing person 12 is indicated at 28. It is noted that the field of view 28 includes the expected position of the head and other body parts of the non-hearing person 12. Thus, the field of view of each of the persons 10, 12 includes the other person's head. Also within the field of view 28 of the hearing person 12 are positioned a second video camera 30 and a second display 32. The video camera 30 takes images of the hearing person 12 which are transmitted to the remote sign language interpreter 20 in the manner to be described herein below in greater detail. The display 32 shows images of the interpreter 20 which typically convey sign language. It should be noted that the microphone 24 can be integrated with the video camera 30 rather than the video camera 16 (or the microphone can be free-standing).

Mechanically, the video camera 30, typically being of smaller dimensions that the display 32, may be mounted thereto and the two components may be movable together by way of a second mechanical arm affixed to the same structure (e.g., a bed) as the one to which is affixed the mechanical arm 22 (if affixed at all). Alternatively, the display 32 and the video camera 30 may stand on a separate structure (e.g., a pedestal 34 as illustrated in FIG. 1). Again, it is within the scope of the present invention to provide an assembly for the video camera 30 and display 32 having a degree of mobility and portability suited to the particular application at hand. The two camera/display assemblies may be independently adjustable in terms of height, azimuth, tilt, etc. This allows the positions of the camera/display assemblies to be adjusted as the individuals 10, 12 change positions within the room.

The addition of the second display 32 and the second video camera 30, located within the field of view 28 of the hearing person 12 that includes the head of the non-hearing person 10, allows the hearing person 12 to convey visual cues to the interpreter 20. This may expedite the interpretation process and improve the accuracy of the information being signed to the non-hearing person 10. In addition, the hearing person 12 benefits from visual cues received from the interpreter 20, which may convey pauses in signing and enhance comprehension of the information being uttered by the interpreter 20. This may further expedite the interpretation process.

Meanwhile, since each person's field of view includes both the image of the interpreter 20 as well as the other person's face, visual contact can be maintained between the non-hearing person 10 and the hearing person 12 during interpretation. This leads to further expedited interpretation and potentially more effective delivery of health care or other services. Specifically, the issue of time lag between question and answer, and knowing when interpreter has finished a sentence or expression, are thus resolved.

Furthermore, the foregoing method and system allow a "natural" rhythm of communication to be established, leading to establishment and preservation of a healthy rapport between the non-hearing person 10 and the hearing person 12, who are able to look at each other while also viewing the interpreter 20. This would not be possible using traditional interpretation or remote interpretation methods in situations where the hearing person 12 and the non-hearing person are at such close quarters.

Figure 2:
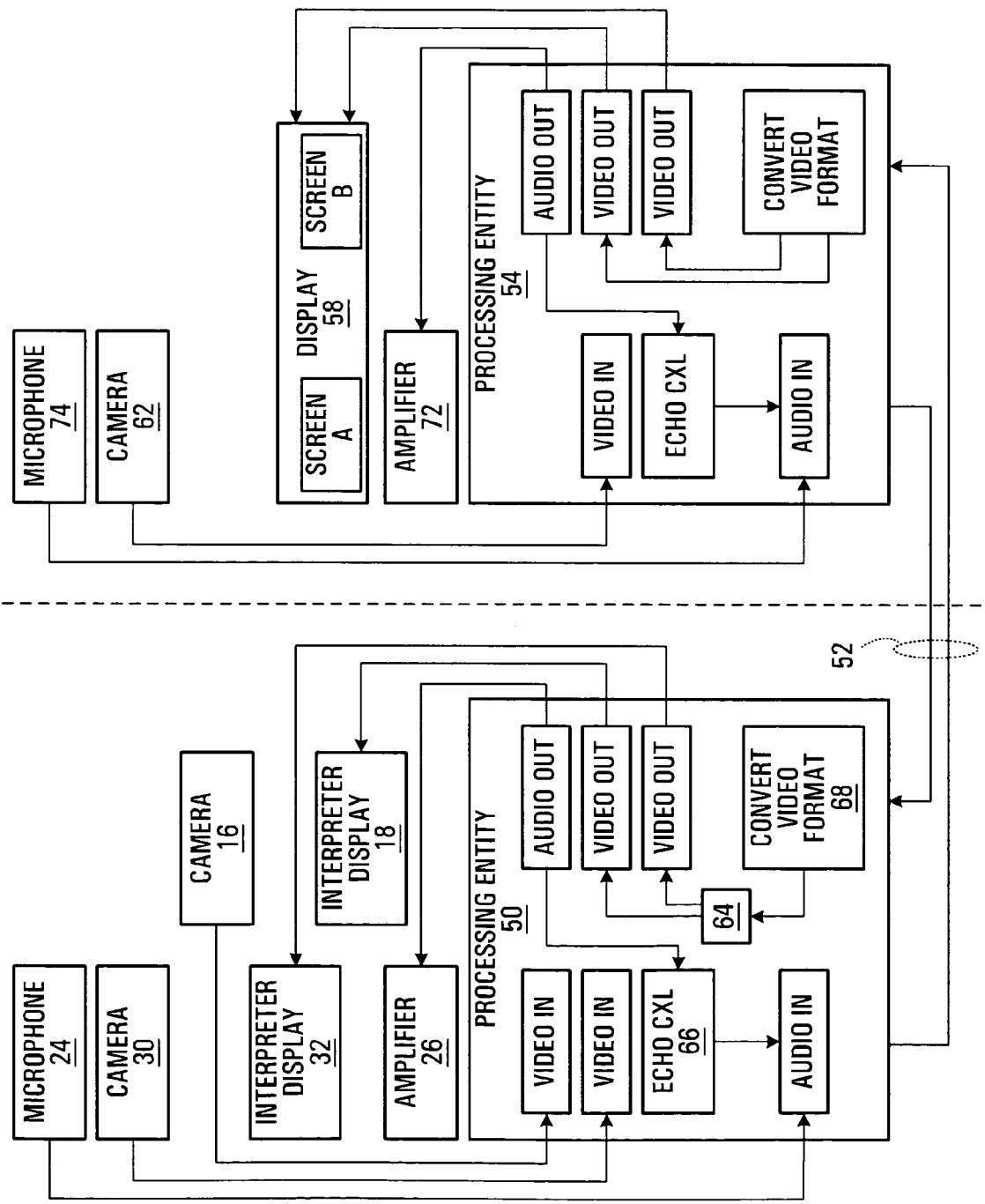
FIG. 2 is a block diagram of a system that can be used to convey the video images and audio streams exchanged by various entities in the setup of FIG. 1.

It should be understood that various hardware and software configurations exist, which allow the above described process to be implemented with the aid of a computer system. For example, FIG. 2 provides a block diagram illustrating a processing entity 50, such as a server or personal computer, adapted to collect video images (including the video images of the non-hearing person 10) captured by the video camera 16, video images (including the video images of the hearing person 12) captured by the video camera 30 and an audio signal (including the audio signal emitted by the hearing person 12) captured by the microphone 24. Software and/or hardware functional modules in the-processing entity 50 transmit the video images and audio signal to a processing entity 54 on the side of the remote sign language interpreter 20 via a communication link 52. The communication link 52 may physically consist of a combination of coaxial cable, optical fiber, wireless and wireline segments, for example. The communication link 52 may be established over a network, such as a local area network (LAN), the public switched telephone network (PSTN) or the Internet.

The video images of the non-hearing person 10, the video images of the hearing person 12 and the audio signal output by the hearing person may travel towards the remote sign language interpreter 20 along individual multimedia streams. In one embodiment, the remote sign language interpreter 20 may be a human located in an establishment such as a call center. The call center includes the processing entity 54 (e.g., a server), which communicates with the processing entity 50 over the communication link 52. The call center may employ plural interpreters and the processing entity 54 at the call center may thus be configured to establish separate links with each of the interpreters and a corresponding processing entity such as the processing entity 50. In the case of the communication link 52 established with the processing entity 50, the processing entity 54 is configured to receive the multimedia streams containing video images of the non-hearing person 10 and the hearing person 12 and to provide these images to a display 58, which is responsible for displaying these separate sets of video images simultaneously, either on the same screen (e.g., a split screen) or on different screens A, B (as alluded to in FIG. 2). In addition, the processing entity 54 is configured to receive the multimedia stream containing the audio signal emitted by the hearing person 12 and to reproduce the audio signal by way of an amplifier 72.

In the reverse direction of communication, the processing entity 54 is configured to receive video images of the interpreter (as captured by a video camera 62) as well as an audio signal emitted by the interpreter 20 (as captured by a microphone 74). The processing entity 54 sends the video images of the interpreter 20 and the audio signal emitted by the interpreter 20 to the processing entity 50 via the communication link 52. Different multimedia streams may be used for this purpose. For example, one multimedia stream may be used to carry the video images of the interpreter 20 and another multimedia stream may be used to carry the audio signal emitted by the interpreter 20.

Upon receipt by the processing entity 50 at the location where sign language interpretation is required, the video images of the interpreter 20 are split and sent to the two displays 18, 32. Splitting of the video images of the interpreter 20 can be done in software by duplication of data or, alternatively, an actual video signal may be generated by the processing entity 50 which is then split using an internal (shown) or external hardware splitter 64, resulting in a pair of sub-streams fed to the pair of displays 18, 32. The option of splitting a video signal in hardware may prove to be desirable if computational power of the processing entity 50 is at a premium. On the other hand, in the absence of a splitter, the former approach may be preferable whereby data is duplicated within the processing entity 50.

It should be appreciated that various peripheral signal processing functions may be executed in order to increase computational efficiency, to save bandwidth or to enhance compatibility. For example, video compression may be performed by the processing entity 50 in order to compress the video images of the non-hearing person 10 and the video images of the hearing person 12. Similar compression techniques could be applied to the audio signal captured by the microphone 24. The details of implementing video and audio compression would be a matter of routine to one of ordinary skill in the art and hence are omitted here. In some cases, it may be preferable to compress the video images of the hearing person 12 to a greater degree than the video images of the non-hearing person 10, as the video images of the non-hearing person 10 may contain high-frequency artifacts that could be lost if excessive compression is applied.

Of course, if video compression is performed on the interpreter side (e.g., by the processing entity 54), then appropriate decompression of the received compressed video images should be performed by the processing entity 50 prior to feeding the video images to the displays 18 and 32.

It is also noted that in the event that the amplifier 26 is a loudspeaker, the microphone 24 may pick up the signal output by the amplifier 26 in addition to the audio signal emitted by the hearing person 10, thus causing an echo in the audio signal transmitted to the interpreter 20. Accordingly, the processing entity 50 may use an echo cancellation unit 66, either in hardware (internal or external) or in software, which has knowledge of the signal being fed to the amplifier 26 and attempts to remove traces of this signal from the signal captured by the microphone 24, leaving a "cleaner" version of the audio signal emitted by the hearing person 12. The details of implementing a suitable echo cancellation unit 66 would be a matter of routine for a skilled person and thus are omitted here. Of course, the processing entity 54 may also be equipped with its own homologous echo cancellation unit.

It will also be appreciated that the compression and decompression processes performed by the processing entity 50 are independent of one another as they act on streams travelling in opposite directions. Thus, it is within the scope of the present invention to perform the compression and decompression operations using separate processors operating in parallel, either on the same machine or on different machines. The details of programming the processing entity 50 to achieve varying degrees of parallelism or to meet desired efficiency criteria would be a matter of routine to one of ordinary skill in the art and hence art omitted here.

Furthermore, there is often a difference between the format of a digital video stream output by a video camera and the format of a video signal that is accepted by a display, particularly a computer display. Suitable format conversion could thus be provided in the processing entity 50 by a conversion module 68. For example, if the format of the digital video output by the camera 62 is format X, and if the displays 18, 32 do not accept X but accept Y, then suitable conversion of the received video streams in X format could be provided at the processing entity 50 prior to display by the displays 18, 32. It is within the scope of the present invention to perform format conversion prior to transmission along the communication link 52, rather than prior to feeding a display. Of course, the processing entity 54 may also be equipped with its own homologous conversion unit.

It should further be appreciated that the processor(s) in the processing entity 50 may be implemented as an arithmetic and logic unit (ALU) having access to a code memory (not shown) which stores program instructions for the operation of the ALU. The program instructions could be stored on a medium which is fixed, tangible and readable directly by the processor, (e.g., removable diskette, CD-ROM, ROM, or fixed disk), or the program instructions could be stored remotely but transmittable to the processor via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art should further appreciate that in some embodiments of the invention, the functionality of the processor may be implemented as pre-programmed hardware or firmware elements (e.g., application specific integrated circuits (ASICs), electrically erasable programmable read-only memories (EEPROMs), etc.), or other related components.

Although the above description has assumed that the interpreter 20 is a human, it is envisaged that in future applications, pattern recognition software, voice recognition software, video synthesis and audio synthesis will have advanced to such a level to automate the functions of the interpreter 20. Of course, variations in what is understood to be meant by "interpreter", which may be caused by advances in technology, do not limit the scope of the present invention.

While specific embodiments of the present invention have been described and illustrated, it will be apparent to those skilled in the art that numerous modifications and variations can be made without departing from the scope of the invention as defined in the appended claims.

What is claimed is:

1. A method of providing language interpretation between a first person and a second person in visual contact with one another, comprising:
   receiving from a remote language interpreter an audio signal emitted by the interpreter and video images of the interpreter;
   outputting the audio signal emitted by the interpreter;
   displaying the video images of the interpreter on a first display viewable by the first person while the first person maintains visual contact with the second person; and
   displaying the video images of the interpreter on a second display viewable by the second person while the second person maintains visual contact with the first person.

2. The method defined in claim 1, wherein the language is sign language.

3. The method defined in claim 1, further comprising:
   transmitting to the remote language interpreter video images of the first person, video images of the second person and an audio signal emitted by at least the second person.

4. The method defined in claim 3, further comprising:
   using a first video camera to capture the video images of the first person.

5. The method defined in claim 4, the first video camera being mounted to the first display.

6. The method defined in claim 5, further comprising:
   using a second video camera to capture the video images of the second person.

7. The method defined in claim 6, the second video camera being mounted to the second display.

8. The method defined in claim 7, further comprising:
   using a first microphone to capture the audio signal emitted by at least the second person.

9. The method defined in claim 8, further comprising:
   using an amplifier to output the audio signal emitted by the interpreter.

10. The method defined in claim 9, further comprising:
    canceling echo in the audio signal captured by the microphone caused by the audio signal output by the amplifier, thereby to create the audio signal emitted by at least the second person.

11. The method defined in claim 10, further comprising:
    compressing the video images of the second person to a greater degree than the video images of the first person prior to transmission of the video images of the first and second persons to the remote language interpreter.

12. The method defined in claim 11, wherein the language is sign language.

13. The method defined in claim 10, further comprising:
    compressing the video images of the first person and the video images of the second person prior to transmission thereof to the remote language interpreter.

14. The method defined in claim 13, further comprising:
    decompressing the video images of the interpreter prior to display thereof on the first and second displays.

15. The method defined in claim 14, further comprising:
    using separate processors to perform the compressing and the decompressing, respectively.

16. The method defined in claim 15, further comprising:
    converting the decompressed video images of the interpreter into a format suitable for display by the first and second displays.

17. The method defined in claim 16, further comprising:
    compressing the audio signal emitted by at least the second person prior to transmission thereof to the remote language interpreter.

18. The method defined in claim 17, further comprising:
decompressing the audio signal emitted by the interpreter prior to output thereof by the amplifier.

19. The method defined in claim 8, wherein the first video camera and the first display are oriented in a first direction, the method further comprising:
adjusting the first direction in which the first video camera and the first display are oriented.

20. The method defined in claim 19, wherein the second video camera and the second display are oriented in a second direction, the method further comprising:
adjusting the second direction in which the second video camera and the second display are oriented.

21. The method defined in claim 20, wherein the video images of the interpreter are conveyed by a received video stream, the method further comprising:
splitting the received video stream into first and second sub-streams;
feeding the first and second sub-streams to the first and second displays, respectively.

22. The method defined in claim 21, wherein splitting the received video stream into first and second sub-streams is performed by hardware splitting of a video signal carrying the received video stream, resulting in creation of the first and second sub-streams.

23. The method defined in claim 21, wherein splitting the received video stream into first and second sub-streams is performed by software duplication of data carried by the received video stream, resulting in creation of the first and second sub-streams.

24. A system for providing language interpretation between a first person and a second person in visual contact with one another, comprising:

means for receiving from a remote language interpreter an audio signal emitted by the interpreter and video images of the interpreter;

means for outputting the audio signal emitted by the interpreter;

means for displaying the video images of the interpreter on a first display viewable by the first person while the first person maintains visual contact with the second person; and means for displaying the video images of the interpreter on a second display viewable by the second person while the second person maintains visual contact with the first person.

\* \* \* \* \*